Nov. 3, 1953 A. DAVISON ET AL 2,658,112

ELECTRICAL SIGNALING SYSTEM

Filed April 12, 1950 3 Sheets-Sheet 1

INVENTORS
ALAN DAVISON
RONALD THREADGOLD
BY Lippincott & Smith
ATTORNEYS

Nov. 3, 1953

A. DAVISON ET AL 2,658,112

ELECTRICAL SIGNALING SYSTEM

Filed April 12, 1950

3 Sheets-Sheet 2

INVENTORS
ALAN DAVISON
RONALD THREADGOLD
BY
Lippincott & Smith
ATTORNEYS

Nov. 3, 1953 A. DAVISON ET AL 2,658,112

ELECTRICAL SIGNALING SYSTEM

Filed April 12, 1950 3 Sheets-Sheet 3

INVENTORS
ALAN DAVISON
RONALD THREADGOLD
BY Lippincott & Smith
ATTORNEYS

Patented Nov. 3, 1953 2,658,112

UNITED STATES PATENT OFFICE 2,658,112

ELECTRICAL SIGNALING SYSTEM

Alan Davison and Ronald Threadgold, Liverpool, England, assignors to Automatic Telephone & Electric Company Limited, Liverpool, England, a British company Application April 12, 1950, Serial No. 155,488

Claims priority, application Great Britain May 5, 1949

7 Claims. (Cl. 179—84)

Figure 1:
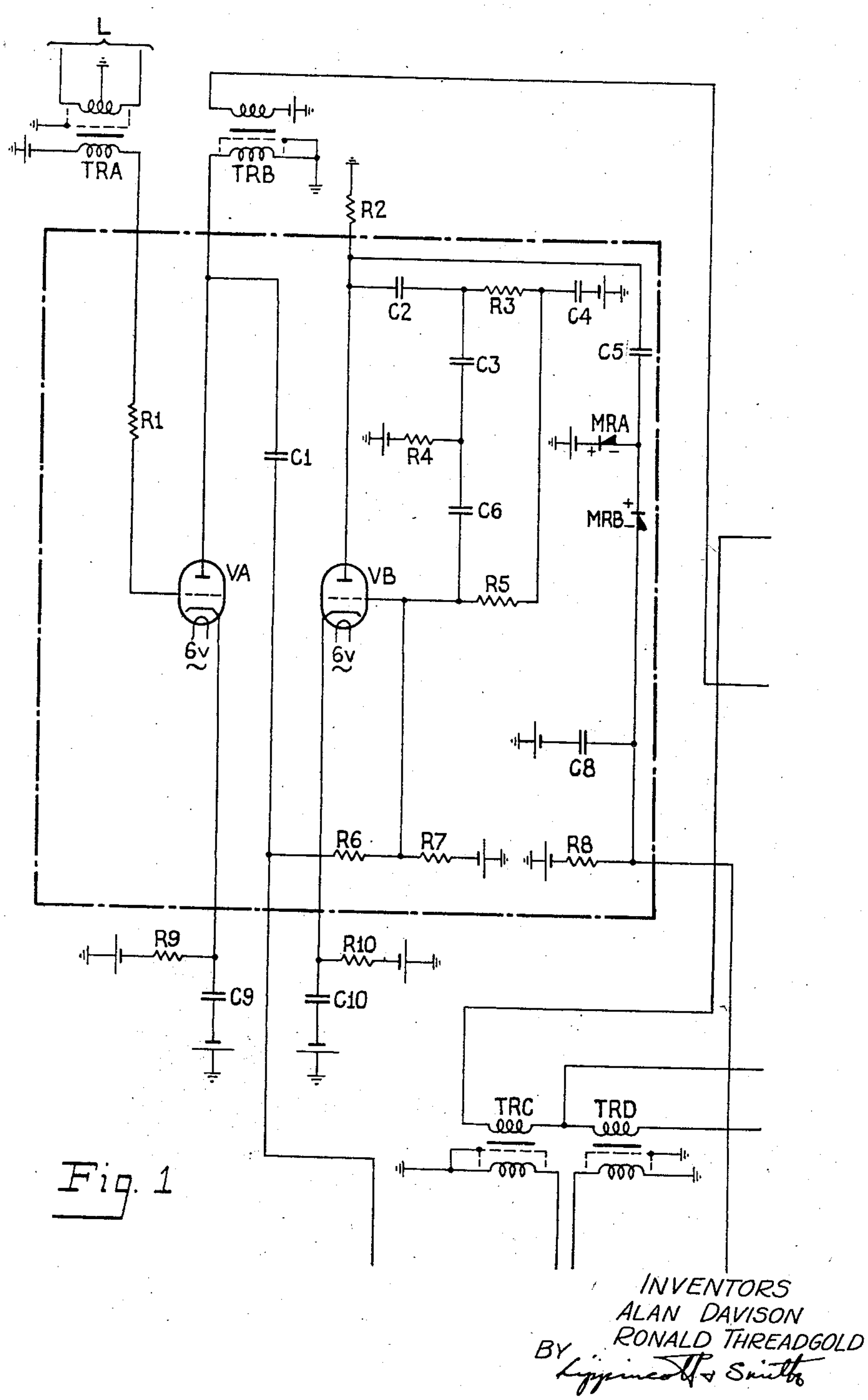

The present invention relates to electrical signalling systems and is more particularly concerned with systems in which alternating current signals are transmitted over channels which are also employed for the transmission of complex currents including the frequencies used for said alternating current signals.

Such a signalling system is particularly applicable to a telephone system for long distance communication in which alternating current signals of one or more predetermined frequencies are employed either singly or in combination for control and supervisory purposes. The problem then arises of providing a signal receiving circuit which will respond to the appropriate alternating current signals but will not respond to those components of the complex currents having the same frequency or frequencies as the alternating current signals or having a frequency or frequencies, the harmonics of which are of the same frequency or frequencies as the alternating current signals. In the case of a telephone system the complex currents will of course be speech currents.

It is well known that if a complex current includes a component having the same frequency as the alternating current signal it also includes a component having a frequency which is a sub-multiple of the signal frequency and this fact has been used in telephone systems for controlling the signal responding circuit so that it will respond only to the signal frequency or frequencies by the provision of a tuned guard circuit. This guard circuit is broadly tuned to a range of frequencies which includes the sub-multiples of the signal frequencies, and is in effect a means for determining when complex currents are present and for causing in such circumstances the backing off of the signal receiver. Usually the output from the tuned guard circuit is applied either alone or in combination with the output of an aperiodic guard circuit directly to the thermionic valve or valves in the signal responding circuit, the valves being cut off when the output from the tuned guard circuit rises above a predetermined minimum.

The signal receiver also includes a selective amplifier or amplifiers tuned to the signal frequencies and a preferable arrangement would be to apply the output from the tuned guard circuit to the amplifier or amplifiers instead of directly to the signal responding circuit since a greater control could be obtained by this method. However, the selective amplifiers are provided with tuned circuits including inductance and capacity which have a high Q value and it is found that with such circuits it is a matter of considerable difficulty to prevent the passage of a current of the signal frequency by a control dependent on a current which is a sub-multiple of the signal frequency.

It is the main object of the present invention to provide an arrangement which will avoid this difficulty and which enables the control by the tuned guard circuit to be effective on the selective amplifiers.

According therefore to one feature of the invention, in an alternating current signal receiver having a selective amplifier or amplifiers tuned to the signal frequency or frequencies and provided with means for preventing the response of the receiver to complex currents which include the signal frequency or frequencies, the selective amplifier or amplifiers comprise at least one thermionic valve which is rendered selective by a circuit which causes negative feedback to occur between the output and input circuits of the amplifier only at frequencies other than the signal frequency.

According to a further feature of the invention, in an alternating current receiver having a selective thermionic valve amplifier or amplifiers tuned to the signal frequency or frequencies and employing a tuned guard circuit, tuning of the amplifier or amplifiers is effected by the use of a circuit which causes negative feedback to occur between the output and input of the amplifier only at frequencies other than the signal frequency and a voltage derived from the output of the tuned guard circuit is applied as a negative bias to the amplifier or amplifiers in order to prevent the response thereof to complex currents which include the signal frequency or frequencies.

It is also usual for the signal receiving circuit used in telephone systems to include a limiting device which limits all signals incoming over the communication path to a substantially constant level within the receiver. These limiters which often involve a thermionic valve working in an overloaded condition are inherently responsible for some degree of harmonic generation.

Since the presence of a component having the signal frequency in the complex currents also involves the presence of a component having a frequency which is a sub-multiple of the signal frequency, harmonic generation by the limiter may increase the proportion of the signal frequency component and in consequence there is a tendency for the signal responding circuit to be falsely operated. Further this false operation may take place even though a tuned guard circuit is incorporated in the receiver. Consequently it will be of advantage to provide a limiting arrangement in which harmonic generation is appreciably reduced.

A further object of the invention therefore is to provide an improved limiting arrangement for use in an alternating current signal receiver to render the receiver more immune from operation by spurious signals.

According to another feature of the invention an input limiting device comprises an overloaded thermionic valve amplifier having an alternating current load which varies in accordance with the output of the amplifier.

According to another feature of the invention an input limiting device comprises an overloaded thermionic valve amplifier and arrangements are provided so that the output waveform of the amplifier is a function of the non-linear characteristic of the valve and of a non-linear resistor included in the output circuit.

Figures 2, 4:
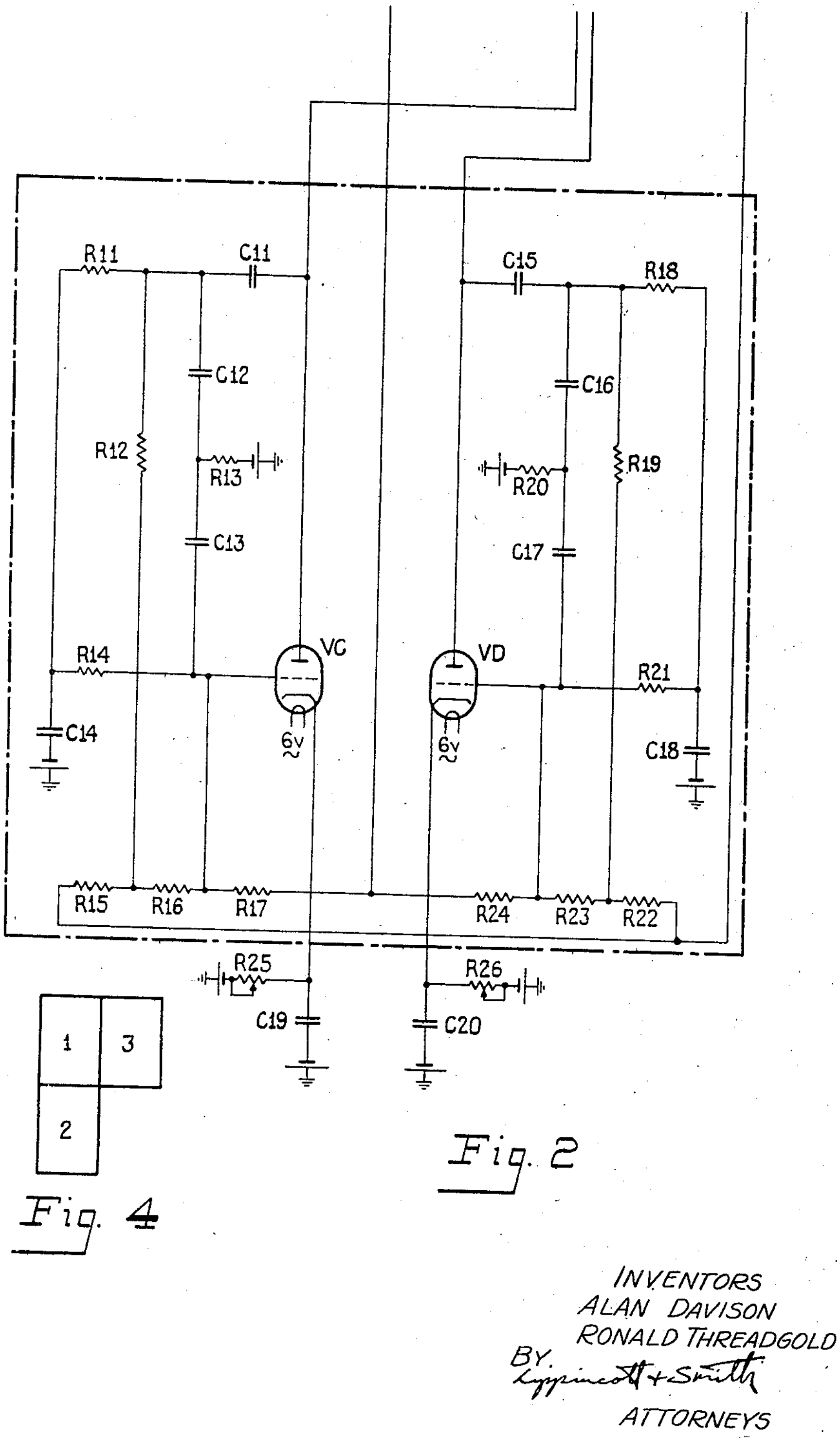
Figure 3:
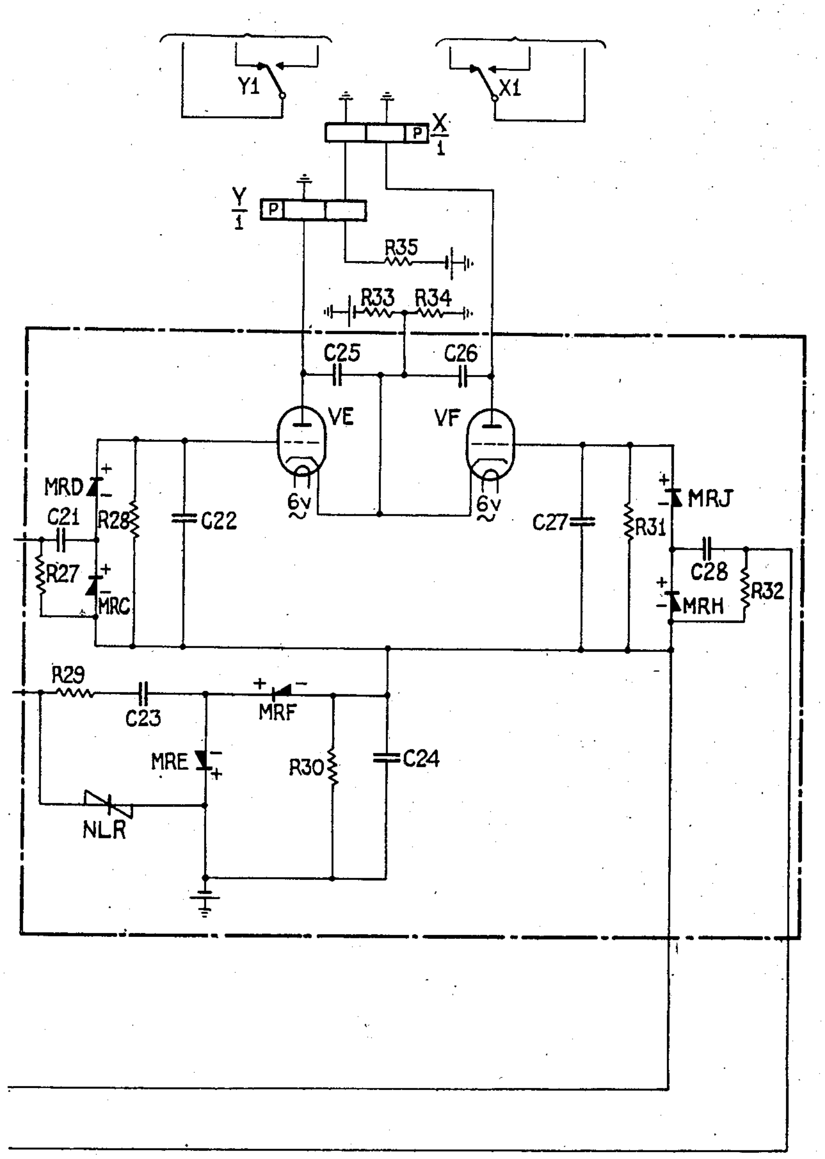

The invention will be better understood from the following description of one method of carrying it into effect, as applied to a simple 600/750 cycles per second voice frequency receiver for use in a telephone system, and should be read in conjunction with the accompanying circuit drawing comprising Figs. 1 to 3 arranged according to Fig. 4.

The receiver embodies six triode amplifying valves VA to VF having the cathodes indirectly heated from a 6 volts A. C. supply. Apart from the heater supply the circuit is served by a 50 volt telephone exchange battery and it may be noted that in conformity with accepted telephone practice the positive plate of the battery is connected to earth. The circuit comprises essentially the following elements:

(a) A signal responding circuit comprising two polarised electromagnetic relays X and Y, controlled by valves VF and VE respectively which are to be operated when single frequency signals of 750 and 600 C. P. S. respectively within limits of say + and −20 C. P. S. are applied to the receiver;

(b) An input signal limiter effective at all frequencies and involving valve VA, (c) A frequency selective amplifier using valve VD, and tuned to 750 C. P. S., (d) A frequency selective amplifier using valve VC, and tuned to 600 C. P. S., (e) A tuned guard circuit employing valve VB in a selective frequency amplifier arrangement effective over a range of say 150 to 450 C. P. S. and (f) An aperiodic guard circuit.

In the quiescent state of the receiver, valves VF and VE in the signal responding circuit are well below cut-off by virtue of the cathode potential derived from resistors R33 and R34, and in consequence only the left and right-hand windings of relay X and Y respectively are energised. The current in these windings is limited by resistor R35, but is sufficient to ensure that the relay contacts X1 and Y1 are set in the position shown.

The incoming line L terminates on the primary winding of the screened input transformer TRA, the centre point of said winding being connected to earth, while the transformer secondary winding extends over resistor R1 to the grid of valve VA. This valve has a standing bias applied to the cathode by the battery shown and is automatically biased by the cathode resistor R9 connected in parallel with the bypass capacitor C9. Valve VA is arranged to function as a class A amplifier. However, when alternating currents from any source are received over the line, the amplitude of the grid swing at valve VA is such that the signal waveform across the primary winding of transformer TRB, constituting the anode-load, is clipped at the peak of each half cycle. Thus valve VA, working in an overloaded condition, tends, in an important degree, to give a constant output level independent of the strength of the incoming signal. In practice however it is found that constancy of output level is not maintained and that with input signal levels greater than a certain value the amplitude of the anode waveform is still increased somewhat. Moreover in all cases the positive half cycles of the anode waveform are considerably distorted at the peaks. Thus the valve in itself is not completely satisfactory for limiting purposes and it is found to be advantageous to utilise additional means to effect an improvement. To this end the non-linear resistor NLR, which is preferably in the form of a disc of silicon-carbide compound known by the registered trade-mark "Atmite," is connected across the aperiodic guard path extending from the secondary winding of transformer TRB. The characteristics of the non-linear resistor are such that its resistance varies instantaneously and inversely with changes of applied voltages. The non-linear resistor is effective on each half cycle of the signal, modified as before-mentioned due to the action of valve VA, in such a manner that it appears, through the intermediary of transformer TRB, as a varying A. C. load in the anode circuit of the valve, with the result that the rise in potential at the anode tends to be compensated. By this means output signals at a substantially constant level are obtained even though the input signals to the receiver may vary over a considerable range. Furthermore by introducing the non-linear resistor, and due to the interrelationship of its effect with that of the non-linear characteristic of the valve, an improvement in the waveform is obtained and as a result harmonic generation which may be responsible for false operation of the polarised relays, is reduced.

The signals at the anode of valve VA are extended over capacitor C1 and separately by way of resistors R17, R24 and R6 to the grids of the valves in the three selective amplifier circuits. At the same time the signals appearing across the secondary winding of transformer TRB are extended for aperiodic guarding purposes over the high value resistor R29 to a circuit arrangement of the conventional voltage doubling type and comprising capacitors C23 and C24, rectifiers MRE and MRF and resistor R30. Resistor R29 is included to minimise the shunting effect of the said circuit arrangement upon the non-linear resistor NLR. It should be noted that rectifiers MRE and MRF are connected in a manner to produce a negative guard potential at the upper end of resistor R30, and this condition applies to and is substantially constant at all frequencies.

Each of the frequency selective amplifiers includes a band-pass filter of the resistance/capacity parallel T-type and it may be mentioned that this type of filter is to be preferred to the corresponding inductance/capacity filter since components requiring special magnetic dust cores for working to close limits of inductance are eliminated. Moreover the filters employed provide improved performance in that, in association with the valves, attenuation/frequency characteristics with steeper sides are obtained. Essentially the circuit consists of an amplifier and a feedback network so arranged that at the signal frequency there is substantially no feedback and the normal gain of the amplifier is obtained. Above and below the signal frequency, the feedback network becomes effective and a reduction in gain takes place. One filter, coupled with valve VD, comprises capacitors C16, C17 and C18 together with resistors R16, R21 and R20, and is sharply tuned to one of the legitimate signal frequencies namely 750 C. P. S. (+ or − say 20 C. P. S.). A second filter, sharply tuned to the signal frequency of 600 C. P. S. is associated with valve VC and comprises capacitors C12, C13 and C14, and resistors R11, R14 and R13. The third filter, which is involved in the tuned guard circuit and is associated with valve VB, comprises capacitors C3, C6 and C4 together with resistors R3, R5 and R4 This circuit, which is broadly tuned to 250 C. P. S. enables an adequate guard condition to be effected over a frequency band of say between 150 and 450 C. P. S. and is primarily intended to disable the receiver when speech currents appear in the transmission path.

Referring first to the tuned guard circuit, valve VB and its associated filter circuit provides for much increased amplification over a frequency range 150 to 450 C. P. S. and signals within this range will appear at the receiver input as a component of speech currents. The amplified signals are extended to the voltage doubling type circuit, comprising capacitors C5 and C8, rectifiers MRA and MRB and resistor R8, which is arranged to produce a negative potential at the right-hand end of resistor R8. This potential, is applied as a bias to the valves VC and VD.

The characteristics of the resistance/capacity parallel T-type feedback bridge associated with valve VD are such that signals, other than those having a frequency of substantially 750 C. P. S. extending from the limiter circuit to the grid of said valve are subjected to a large amount of degeneration. However when a signal of substantially 750 C. P. S. is received the amount of degeneration is greatly reduced and consequently a large output appears in the valve anode. In addition the valve is subjected to a biasing voltage due to the rectified output of the tuned guard circuit as described above. This biasing voltage will be small when the 750 C. P. S. signal is being received but will increase when complex currents are being received. It may be mentioned that to compensate for possible changes in the selective amplifier, for example due to ageing of the valve or fluctuations in the supply, a normal feedback path consisting of resistor R19 to the common point of resistors R22 and R23 is provided, and this path gives a constant amount of degeneration at all frequencies, including 750 C. P. S. Amplified 750 C. P. S. signals appear across the primary winding of the screened transformer TRD which is coupled to a circuit element, of the voltage doubling type, comprising capacitors C28 and C27, rectifiers MRH and MRJ, and resistor R31. The output of the said circuit element is such that a positive potential is developed at the upper end of resistor R31, and this is applied to the grid of valve VF. Providing that this potential is sufficiently large and is not excessively counteracted by the output of the aperiodic guard circuit, valve VF is caused to conduct. This condition obtains when a legitimate signal of substantially 750 C. P. S. is received over the line, and as a result the right-hand winding of relay X is energised in opposition to the energisation of the other winding and to such a degree as to cause contacts X1 to be set in the alternative condition. Relay X will of course return to its former state when the valve is cut-off upon disconnection of 750 C. P. S. input signal. Resistor R32 is conected across the secondary winding of transformer TRD to stabilise the load on that transformer, and it may be mentioned that resistor R27 serves a similar function with respect to transformer TRC.

Valve VC and its associated filter function in a similar manner to the foregoing except that the circuit components of the filter are modified to enable selective amplification to be effected on input signals of substantially 600 C. P. S. Moreover the amplified signals are injected by transformer TRC into the voltage doubling arrangement comprising capacitors C21 and C22, rectifiers MRC and MRD and resistor R28. In this case the positive potential obtaining at the upper end of resistor R28, and extending to the grid of valve VE when a legitimate signal of 600 C. P. S. is applied to the receiver input, enables said valve to conduct whereupon relay Y alone is operated.

It will be appreciated that when legitimate signals of 750 C. P. S. or 600 C. P. S. are received over the line, even though the constant guard voltage across resistor R30 due to the aperiodic guard circuit is developed and another small guard voltage is developed across resistor R8 due to the reduced amplification of the tuned guard circuit, the voltage across resistor R31 or R28 is adequate to ensure that the appropriate polarised relay is operated.

However when complex speech currents are received, and these may well include frequencies similar to the legitimate signals, the effect on valves VC and VD of the increased guard voltage appearing across resistor R8 and resulting from increased amplification of the tuned guard circuit, together with the guard voltage of the aperiodic circuit, applied to VE and VF is sufficient to ensure that the operation of the polarised relays by the spurious signals is extremely unlikely.

An improvement in the shape of the pulses delivered by the selective amplifiers may be obtained by adjusting the cathode potentials by means of the variable resistors R25 and R26 so that in the absence of current of the signalling frequencies, the valves VC and VD are just taking current. A connection is taken from the secondary winding of transformer TRB to the common grid returns of VC and VD, the connection including a rectifier arranged so that an incoming signal causes a positive rectified voltage to be applied to the grids of VC and VD which will rapidly bring them to the normal operating point. If the incoming signal is a pulse of one of the signalling frequencies, the appropriate valve will be at its normal operating point for a time equal to the duration of the pulse with a rapid build up and die away at the beginning and end of the pulse respectively.

It may be mentioned that the invention is in no way limited in scope to voice frequency receivers of the simple frequency responding type or to receivers employing two such frequencies. Indeed it will be apparent to those skilled in the art that by simple modifications to the circuit described it might well be converted to a receiver of the compound signal type to which the invention would equally apply. It will also be understood that while the selective amplifiers have been shown with a single thermionic valve, more than one could be used and the feedback network would then preferably extend from the output of the last valve to the input of the first.

We claim:

1. In a signal receiver subjected to at least one signal frequency current and to complex currents which include said signal frequency, the combination of a guard circuit, means in said guard circuit for generating a biasing voltage in response to the reception of said complex frequency currents, at least one amplifier for amplifying said signal frequency current, a negative feedback circuit in said amplifier, a filter circuit having a maximum response to currents of said signal frequency and included in said feedback circuit, at least one signal receiving circuit, means for applying the output from said amplifier to said signal receiving circuit and means for applying said biasing voltage to said amplifier to cut off said amplifier in response to the reception of said complex currents.

2. In a signal receiver subjected to at least one signal frequency current and to complex currents which include said signal frequency, the combination of a guard circuit, input and output circuits for said guard circuit, a negative feedback circuit connected between said output and input circuits, a filter circuit having a maximum response over a range of frequencies which includes at least one sub-harmonic of said signal frequency and included in said feedback circuit, means for feeding said signal frequency current and said complex currents to said input circuit, at least one amplifier for amplifying said signal frequency current, input and output circuits for said amplifier, a negative feedback circuit connected between said output and input circuits, a filter circuit having a maximum response to currents of said signal frequency and included in said feedback circuit and means for rectifying the current in said output circuit of said guard circuit and for applying the rectified voltage to said amplifier to cut off said amplifier in response to the reception of said complex currents.

3. A signal receiver comprising a line over which at least one signal frequency current and complex currents which include said signal frequency current are received, an aperiodic amplifier having an input circuit to which said line is connected and first, second and third output circuits, a receiving circuit for responding to said signal frequency current, means for rectifying the current in said first output circuit and for applying the rectified voltage to bias off said receiving circuit, a guard circuit tuned to respond to a range of frequencies including at least one sub-harmonic of said signal frequency current and having input and output circuits, means connecting said second output circuit to the input circuit of said guard circuit, at least one amplifier for amplifying said signal frequency, a negative feedback circuit in said amplifier, a filter circuit having a maximum response to currents of said signal frequency and included in said feedback circuit, input and output circuits for said amplifier, means for rectifying the current in the output circuit of said guard circuit and for applying the rectified voltage to bias off said amplifier, means connecting said third output circuit to the input circuit of said amplifier and means connecting the output circuit of said amplifier to said receiving circuit.

4. A signal receiver comprising a line over which first and second signal frequency currents and speech currents which include said signal frequency currents are received, an aperiodic amplifier having an input circuit to which said line is connected and first, second and third output circuits, a receiving circuit for responding to both said signal frequency currents, means for rectifying the current in said first output circuit and for applying the rectified voltage to bias off said receiving circuit, a guard circuit tuned to respond to a range of frequencies including at least one sub-harmonic of both said signal frequency currents and having input and output circuits, means connecting said second output circuit to the input circuit of said guard circuit, a first amplifier for amplifying said first signal frequency current and having input and output circuits, a negative feedback path connected between said input and output circuits of said first amplifier, a first filter circuit having a maximum response to said first signal frequency currents and included in said first feedback circuit, a second amplifier for amplifying said second signal frequency current and having input and output circuits, a negative feedback path connected between said input and output circuits of said second amplifier, a second filter circuit having a maximum response to said second signal frequency currents and included in said second feedback circuit, means for rectifying the current in the output circuit of said guard circuit and for applying the rectified voltage in parallel to the input circuits of said first and second amplifiers to bias off said amplifiers, means connecting said third output circuit of said aperiodic amplifier in parallel to the input circuits of said first and second amplifiers and means connecting the output circuits of said first and second amplifiers to said receiving circuit.

5. A signal receiver as claimed in claim 4 wherein said guard circuit includes an input circuit and an output circuit, a negative feedback path connected between said output and input circuits and a filter circuit of the resistance and capacity parallel T-type having a maximum response over a range of frequencies which includes at least one sub-harmonic of both said signal frequencies, said filter circuit being included in said feedback circuit.

6. A signal receiver as claimed in claim 4 and comprising biasing means for said aperiodic amplifier whereby the amplifier operates above saturation to give a limiting effect and an alternating current load for said amplifier.

7. A signal amplifier as claimed in claim 6 wherein said alternating current load includes a non-linear resistor connected across said first output circuit.

ALAN DAVISON.
RONALD THREADGOLD.

References Cited in the file of this patent

UNITED STATES PATENTS

| Number | Name | Date |
| --- | --- | --- |
| 2,173,427 | Scott | Sept. 19, 1939 |
| 2,237,661 | Ernst | Apr. 8, 1941 |
| 2,266,541 | Foster et al. | Dec. 16, 1941 |
| 2,284,855 | West | June 2, 1942 |
| 2,316,909 | Weagant | Apr. 20, 1943 |
| 2,350,951 | Zinn | June 6, 1944 |
| 2,397,337 | Clough | Mar. 26, 1946 |
| 2,457,131 | Curtis | Dec. 28, 1948 |
| 2,496,909 | Eberhard | Feb. 7, 1950 |